Sept. 25, 1951　　　　　　　A. PECHER　　　　　　　2,569,188
PATTERN GRADING MACHINE

Filed Jan. 18, 1947　　　　　　　　　　　　　　2 Sheets-Sheet 1

INVENTOR.
Albrecht Pecher
BY
Robert S. Dunham
Atty.

Sept. 25, 1951 A. PECHER 2,569,188
PATTERN GRADING MACHINE

Filed Jan. 18, 1947 2 Sheets-Sheet 2

INVENTOR.
Albrecht Pecher
BY
Robert S. Dunham
Atty.

Patented Sept. 25, 1951

2,569,188

UNITED STATES PATENT OFFICE 2,569,188

PATTERN GRADING MACHINE

Albrecht Pecher, Orebro, Sweden

Application January 18, 1947, Serial No. 722,914
In Sweden January 29, 1946

5 Claims. (Cl. 33—23)

The invention relates to such machines as are used in the manufacture of shoes when they are intended for manufacturing shoes in series with patterns of a similar kind but of different dimensions. In order to effect these dimension changes when making the patterns two transforming arms resembling pantographs are used, which work in a rectangular co-ordinate system, by means of which mathematically correct enlargements and diminutions can be attained.

The device differs from known devices for this purpose mainly in such a way that the adjustment for different sizes occurs by means of four sliding adjusting rods, two for each adjusting arm. The adjustment is made with respect to scales fixed on the adjusting arms. The scales are graduated either in millimeters or in stitches or both in combination. The deflexion movement of the arms is directly proportional to the positions of the rods with respect to their respective arm, which cause the transformations which bring about designs which are exactly equal to or proportional to a master pattern.

Figure 1:
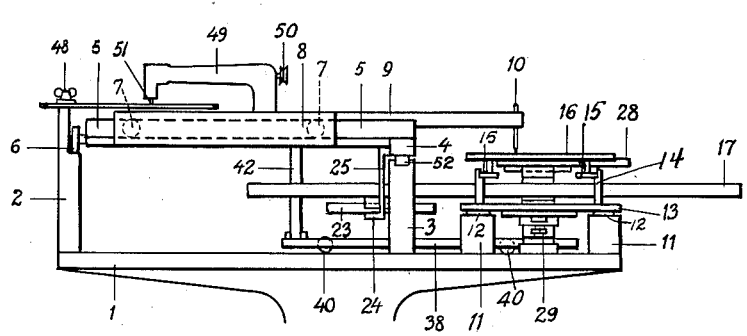
Figure 2:
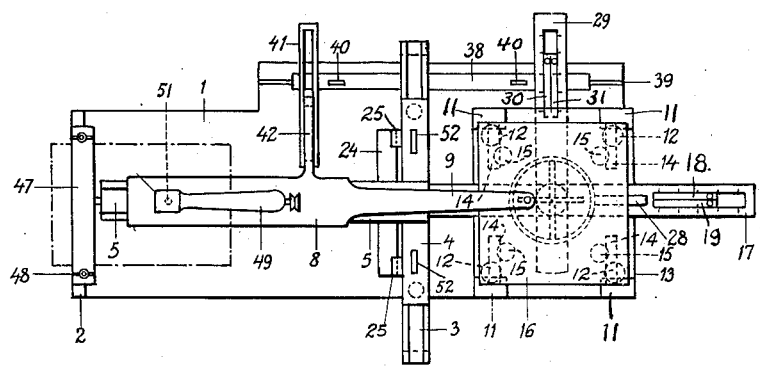
Figure 3:
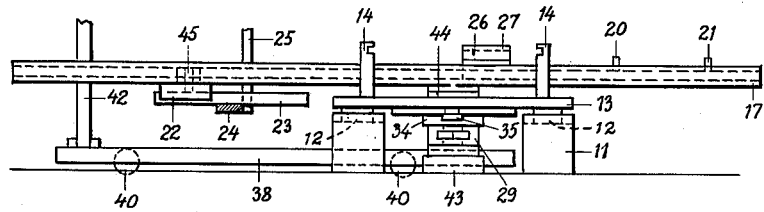
Figure 4:
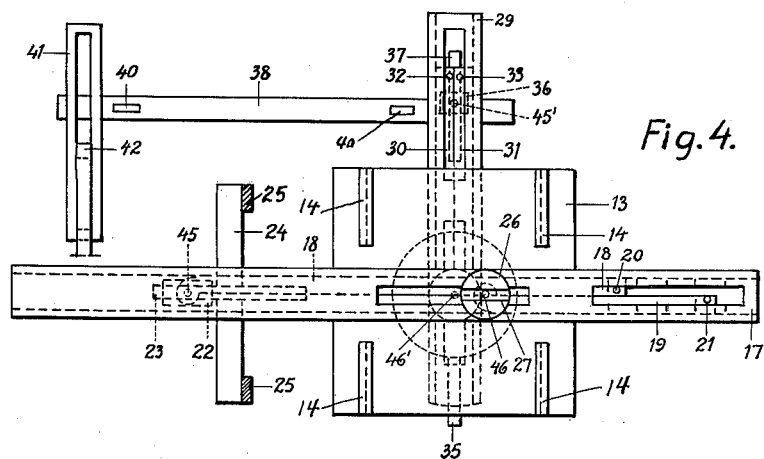
Figure 5:
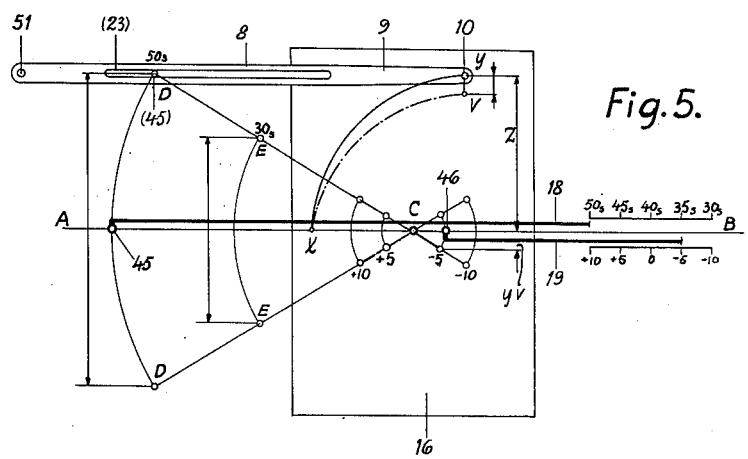

The device is shown on the enclosed drawings in an achievement chosen as an example, which may be varied within broad limits without the principle being abandoned. Fig. 1 shows the machine from the side, Fig. 2 shows it from above. Figs. 3 and 4 show parts of Figs. 1 and 2 on a larger scale and with the settable rods of one of the adjusting arms displaced. Fig. 5 shows a diagram, which demonstrates how the adjusting arms are moved.

The base plate 1 is provided with an upright 2 extending crosswise of the longitudinal direction of the plate 1 and a similarly disposed frame 3, which together serve as guides for a carriage 4. The carriage 4 is provided with carrying rollers 52, which run in grooves on the frame 3. The carriage is rigidly connected to a channelled bar 5, which is supported at one end on a roller 6, which rolls on the upright 2. Along the bar 5 a carriage 8 runs on rollers 7, which carriage consequently can move parallel with itself and also at right angles to itself when the carriage 4 and the bar 5 are moved on their supporting rollers.

The carriage 8 rigidly supports an arm 9, on which the leading pin 10 is fixed. On the plate 1 plinths 11 are arranged, which, by the medium of rollers 12, support and steer a table 13, so that it can move only in the same direction as the longitudinal direction of the carriage 8. The table 13 supports, through the medium of plinths 14 and rollers 15, a table 16 in such a way that table 16 can move with respect to the table 13 only at right angles to the direction of motion of the table 13. The table 16 consequently gets the same directions of motion, in relation to the foot plate 1, as the carriage 8.

The transforming of the rectilinear movements of the tables to curves is brought about by turnable arms 17 and 29. The arm 17 is preferably tubular, and in it there are two parallel adjusting-rods 18 and 19 movable in bearings. Each of these rods is provided with an adjusting index, and when making the adjustment these indices are placed opposite to certain scale graduations on the arm 17. The index on the rod 18 is placed opposite to a shoe number and the index on the rod 19 opposite to a scale graduation. The rod 18 then indicates what shoe number is to be treated, and the rod 19 what diminution or enlargement is wanted. At the side of the indices there are two buttons 20, 21, by means of which the adjustment of the rods 18 and 19, respectively, are brought about. The left end of the rod 18 is at point 45 pivoted to a guide 22, which glides over a slide 23, which, by the medium of a cross-piece 24 and arms 25, is rigidly connected to the carriage 4. The cross-piece 24 forms a right angle with the line A—B (Fig. 5). The left end of the rod 19 is pivotally connected by a pin 46, Figs. 4 and 5, to a plate 26 provided with a groove 27, in which a guide bar with a handle 28 arranged on the underneath side of the table 16 slides, Figs. 1 and 2. The adjusting arm 17 is pivoted for movement about the center C of the plinth 44 on the table 13. The adjusting arm 29 is preferably tubular like the arm 17 and is provided with two longitudinally movable adjusting rods 30 and 31 with adjusting indices and buttons 32 and 33. One end of the rod 30 is pivotally connected by a pin 46' to a plate 34 provided with a groove, in which slides a guide bar 35 with a handle arranged under the table 13, Figs. 3 and 4. One end of the rod 31 is pivoted to a guide 36, which slides on a slide 37 rigidly fixed on a sliding-carriage 38 at right angles with the longitudinal direction of the latter. The carriage 38 is in its longitudinal direction steered by a groove 39 (Fig. 2) and steering rollers 40. On the carriage 38 there is another guide 41 parallel to the slide 37 and in the guide 41 a steering arm 42 slides, which steering arm is rigidly fixed to the carriage 8. The arm 29 is turnable around a plinth 43, which is rigidly fixed to the base plate 1. When the stylus or leading-pin 10 is moved parallel to the line A—B, the outer end of the arm 29 is carried along in the same direction by the slide 37, the guide 36, and the pin 45' by which the guide 36 and the rod 31 are pivotally connected, and, at the same time, the table 16, which is supported on the table 13, is moved in the same or opposite direction, depending upon the set position of the pivot 46' as determined by the position of the rod 30 lengthwise of the arm 29. In the same way the arm 17 is turnable around a rigid plinth 44 on the table 13. The arm 17 at its swinging point C is pivoted to the table 13, and the arm 29 at its swinging point at the center of the plinth 43, which is fixed to the base plate 1, is pivoted with respect to the base plate 1. The pivot 45 and its supporting guide 22 move along a slide 23 which is suspended from the carriage 4 and is moved thereby. The slide 23 is parallel to the line A—B and therefore actuates the pivot 45 only in a direction transverse to the direction of movement of carriage 8 along bar 5, whereas the pivot 45' is actuated by the carriage 8 along bar 5 only in the direction of movement of the carriage 8 along bar 5, that is, longitudinally in relation to the line A—B.

The arm 29 governs the movement of the table 13 in the longitudinal direction of the base plate, by means of which the shoe width is settled. The arm 17 in a similar way regulates the movement of the table 16 at right angles with the said direction, by means of which the shoe-length is settled. The adjustment of the rod 18 will be clear from Fig. 5, which shows that the distances DD:DC=EE:EC, i. e., the longitudinal differences of the shoe numbers are proportional to the distances of the graduation markings on the arm 17.

In a similar way the rod 19 is adjusted with respect to the scale on the opposite side of the central line of the arm 17, but here the fractional markings have a positive meaning on the left side of the zero mark and a negative one to the right of the zero mark. This depends on the fact that the pivot 46, which moves the plate 26 and the table 16, can be moved on both sides of the swinging-point C (Fig. 5) of the arm. The result is that the movement of the table 16 in the former case will be added to the movement of the pin 10 and in the latter case will be subtracted from it.

The arms 17 and 29 are designed on the same principles but work in different directions, i. e., parallel with the symmetry line AB and at right angles with it. The guide bar 28 in the table 16 and the bar 35 in the table 13 are provided in order to be able to give the tables an additional movement in the both main directions and so give the patterns a further increase in length and width, if desired and found suitable.

The machine works in the following way: The rods 18 and 31 are adjusted to the same shoe number, the rods 19 and 30 to the graduation required. A suitable pattern is placed on the table 16 and a slab of suitable material is inserted into the holder 47 and is fastened with the screws 48, so that it comes under the cutting apparatus 49, which is operated by means of the pulley 50 and for instance an electric motor. The pin 10, which has a constant distance from the cutter 51 is moved to follow the pattern on the table 16, and the carriage 8 receives the same movement as the pin 10. The component of movement of the carriage 8 parallel to the line A—B pivots the arm 29, and the component of movement of the carriage 8 at right angles to the line A—B pivots the arm 17. The amount of pivotal movement of the arm 29 is determined by the set position of the rod 31 along the arm 29, which position determines the distance between the pin 45' and the pivoted point of the arm 29 about the fixed center of the plinth 43 on the base plate 1. The amount of pivotal movement of the arm 17 is determined by the set position of the rod 18 along the arm 17, which position determines the distance between the pin 45 and the pivotal point of the arm 17 about the center C on the table 13.

Supposing that the curve $x$—$y$ in accordance with Fig. 5 is to be copied with a diminution of 5 units or degrees. For each of the coordinate directions this diminution is brought about by the arm system 17, 18 and 19 and by the arm system 29, 32 and 33, respectively. The operation of the machine will be clear from a study of one of these systems, say, 17, 18 and 19, which brings about adjustments transverse to the direction A—B of the base-plate. The leading-pin 10, which is a constant distance from the cutter 51, is carried along the edge of the pattern lying on the table 16, say from the point $x$ to the point $y$. Had the machine been set for no diminution, i. e., the rod 19 adjusted to the zero setting, the moving of the cutter 51 in the direction perpendicular to A—B would have been equal to the distance $z$. Assuming the rod 19 to be set for a diminution of 5 units in this direction, as illustrated in Fig. 5, the adjustment has the effect that the table 16 is moved by the medium of the pivots 45 and 46 in the direction opposite to the direction of movement of the leading-pin 10 as the pin 10 follows the edge of the pattern on the table. Actually the pin 10 has moved along the broken line $x$—$v$, by which the deflection of the cutter 51 in the direction of the vertical component of movement has been diminished by the distance $y$—$v$, which represents the diminution required. If instead of diminution an equivalent enlargement is wanted, the index of the rod 19 is adjusted to the scale marking +5, and the table 16 will move in the same direction as the pin 10, while the latter follows the edge of the pattern. The deflection of the cutter has then increased by the same distance as in the former case it had diminished. In order to get the diminution or enlargement of the same number of units, for example, 5 units, for the graduating of a large shoe or a small shoe the index of the rod 18 is adjusted to the shoe number in question. As is apparent from Fig. 5, the largest deflection, for example, the deflection for shoe number $50_s$ will lead to the same diminution $y$—$v$ or enlargement as the smallest deflection for shoe number $30_s$. The pivot 46, which regulates the movement of the table 16 in the cross direction (perpendicular to A—B) is adjusted by the rod 19 to the dimension change wanted. When no change is desired, the pivot 46 is superposed over the point C, so that the table 16 remains stationary and in the position shown in Figs. 1 and 2 during the movement of the leading-pin 10. As may be understood from examining Fig. 5, the adjustment of the rod 19 to positive values (enlargements) will lead to the table 16 moving in the same direction as the pin 10, whereas adjustment to negative values (diminutions) will cause the table to move in the opposite direction. Because the difference between any successive numbers are always equal, the graduations on the arms 17 and 29 will also have the same distance, which contributes to a simple manufacturing and a convenient and safe adjustment.

I claim:

1. In a pattern-graduating mechanism, a fixed base, a first table, means supporting said table for movement lengthwise of said base, a second table, means carried by said first table for guiding said second table for movement of said second table in the crosswise direction of said base, a carriage, means mounting said carriage on said base for movement in directions lengthwise and crosswise of said base, a pantographic system for transmitting motion between said carriage and said second table, said pantographic system including two pivoted pantographic arms extending laterally to one another in directions substantially crosswise and lengthwise of said base, respectively, a pivot pivotally supporting one of said arms with respect to said base, a rod slideably mounted for movement parallel to said arm, a pin engaging with said rod, means attached to said pin and mounted in sliding relation to said first table for movement laterally to the direction of movement of said first table, said rod being settable along its associated arm for changing the location of said pin and attached means with respect to said pivot of said one pantographic arm; a second pivot for the second of said pivoted pantographic arms, said second pivot being carried by said first table, a rod slideably mounted for movement parallel to said second pantographic arm, a second pin engaging with said second rod, means attached to said second pin and mounted in sliding relation to said second table for movement laterally to the direction of movement of said second table with respect to said first table, said last-named rod being settable along its associated arm for changing the location of said last-named pin and attached means with respect to said pivot of said second-named pantographic arm; means connecting said first-named pantographic arm with said carriage for transmitting lengthwise movement between said carriage and said first table, and means connecting said second-named pantographic arm with said carriage for transmitting crosswise movement between said carriage and said second table.

2. In a pattern-graduating mechanism, a fixed base, a carriage mounted on said base for movement in directions lengthwise and crosswise of said base at right angles to each other, a pantographic arm, a pivot pivotally supporting said pantographic arm on said base, a rod positionable along said pivoted arm, means connecting said carriage and said rod for pivoting said arm in accordance with movement of said carriage lengthwise of said base, a first table slideably guided for movement lengthwise of said base, a plate, means slidably connecting said first table and said plate for relative movement in a direction transverse the lengthwise direction of said base, a second rod positionable along said pivoted arm, said second-named rod being pivotally connected to said plate; a second pantographic arm pivoted on said first table, a rod positionable along said second pivoted arm, means connecting said carriage and said last-named rod for pivoting said arm in accordance with movement of said carriage crosswise of said base, a second rod positionable along said second pivoted arm, a second plate, said last-named rod being pivotally connected to said second plate, a second table, means mounted on said first table for guiding the movement of said second table relative to the movement of said first table in a direction crosswise of said base, means slidably connecting said second table and said second plate for guiding said second plate in a direction transverse the crosswise direction of movement of said second table, the rods of each of said pair of rods on said pivoted arms being settable along their respective pivoted arms for controlling the movement of said second table with respect to said carriage lengthwise and crosswise of said base.

3. In a pattern-graduating mechanism, a fixed base, a first table, means for guiding said table for movement lengthwise of said base, a second table, means for guiding said second table for movement of said second table relative to said first table in the crosswise direction of said base, a carriage, means mounting said carriage on said base for movement in directions lengthwise and crosswise of said base, a pantographic system for transmitting motion between said carriage and said second table, said pantographic system including two pivoted pantographic arms extending laterally to one another in directions substantially crosswise and lengthwise of said base, respectively, a pivot pivotally supporting one of said arms with respect to said base, a second pivot for the second of said pivoted arms, said second pivot being carried by said first table, each of said arms having a pair of slideable rods positionable longitudinally of their respective arms, a pin carried by one rod of said pair of rods on the first of said pivoted arms, means connecting said pin to said carriage to effect concomitant movement of said carriage and said first of said pivoted arms, a plate, a second pin extending between said plate and the other rod of the pair of rods on the first of said pivoted arms, means for guiding said plate and said second pin for relative movement with respect to said first table laterally to the direction of movement of said first table, said last-named rod and pin being settable for effecting movement of said first table when its associated pantographic arm is pivoted on its pivot; a third pin carried on one of said rods of said pair of rods on the second of said pivotal arms, means connecting said last-named pin to said carriage to effect concomitant movement of said carriage and said second of said pivoted arms, a second plate, a fourth pin extending between said second plate and the other rod of the second of said pivoted arms, means for guiding said last-named plate and said last-named pin for movement with respect to said second table laterally to the direction of movement of said second table, said last-named rod and pin being settable for effecting movement of said second table when its associated pantographic arm is pivoted on its pivot.

4. In a pattern-graduating mechanism, a fixed base, a first table, means for guiding said table for movement lengthwise of said base, a second table, means for guiding said second table for movement of said second table relative to said first table in the crosswise direction of said base, a carriage, means mounting said carriage on said base for movement in directions lengthwise and crosswise of said base, a pivoted pantographic arm having its center of pivot fixed with respect to said base, means connecting said carriage and said pivoted arm for pivoting said arm in accordance with movement of said carriage in said lengthwise direction, an adjustable rod carried by said arm, a plate having a groove extending laterally to the direction of movement of said first table, a guide bar carried by said first table and slidably engaging in said groove, a pivot pin pivotally engaging said plate and rod, said rod and pin being settable for positioning said pivot pin at either side of said center of pivot of said pantographic arm for effecting desired movement between said carriage and said first table when said pantographic arm is turned about its center of pivot; a second pivoted pantographic arm having its center of pivot attached to said first table, means connecting said carriage and said second pantographic arm for pivoting said arm in accordance with movement of said carriage in said crosswise direction, an adjustable rod carried by said second pantographic arm, a second plate having a groove extending laterally to the direction of movement of said second table with respect to said first table, a guide bar carried by said second table and slidably engaging said groove of said second plate, another pivot pin pivotally engaging said second plate and said last-named rod, said last-named rod and pin being settable for positioning said last-named pin at either side of said center of pivot of said second-named pantographic arm for effecting desired movement between said carriage and said second table when said second pantographic arm is turned about its center of pivot.

5. The combination set forth in claim 4 in which said guide bars extend from their respective tables to provide manipulative means accessible for adjusting the angular relationship of the respective tables for effecting angular deviations of movement of said tables with respect to the lengthwise and crosswise directions of movement of said carriage.

ALBRECHT PECHER.

REFERENCES CITED

The following references are of record in the file of this patent:

UNITED STATES PATENTS

| Number | Name | Date |
|---|---|---|
| 318,540 | Breach | May 26, 1885 |
| 878,046 | Cote | Feb. 4, 1908 |
| 1,801,365 | Pecher | Apr. 21, 1931 |
| 1,933,672 | Kestell et al. | Nov. 7, 1933 |
| 1,977,140 | Pecher | Oct. 16, 1934 |
| 1,993,818 | Akerlind | Mar. 12, 1935 |

FOREIGN PATENTS

| Number | Country | Date |
|---|---|---|
| 689,720 | France | June 2, 1930 |